US012694073B1

(12) United States Patent
Ulasen et al.

(10) Patent No.: US 12,694,073 B1
(45) Date of Patent: Jul. 28, 2026

(54) PROVIDING LARGE LANGUAGE MODEL EMBEDDINGS USING CLUSTERS AND DICTIONARIES

(71) Applicants: Constructor Technology AG, Schaffhausen (CH); Constructor Education and Research Genossenschaft, Schaffhausen (CH)

(72) Inventors: Sergey Ulasen, Singapore (SG); Alexander Tormasov, Busingen am Hochrhein (DE); Serg Bell, Singapore (SG); Stanislav Protasov, Singapore (SG); Nikolay Dobrovolskiy, Alanya (TR); Laurent Dedenis, Geneva (CH)

(73) Assignee: Constructor Technology AG, Schaffhausen (CH)

( * ) Notice: Subject to any disclaimer, the term of this patent is extended or adjusted under 35 U.S.C. 154(b) by 26 days.

(21) Appl. No.: 19/039,006

(22) Filed: Jan. 28, 2025

(51) Int. Cl.
G06F 18/2321 (2023.01)
G06F 40/242 (2020.01)

(52) U.S. Cl.
CPC ........ G06F 18/2321 (2023.01); G06F 40/242 (2020.01)

(58) Field of Classification Search
None
See application file for complete search history.

(56) References Cited

U.S. PATENT DOCUMENTS

| | | | | |
|---|---|---|---|---|
| 11,442,976 | B1 * | 9/2022 | LaBute ................. | G06F 16/353 |
| 12,217,480 | B1 * | 2/2025 | Karpman ............. | G06V 10/761 |
| 12,299,081 | B1 * | 5/2025 | Asi ........................ | G06F 16/345 |
| 12,381,008 | B1 * | 8/2025 | Barve ...................... | G06N 3/04 |
| 2021/0103634 | A1 * | 4/2021 | Gkikas ................... | G06F 40/211 |
| 2023/0386450 | A1 * | 11/2023 | Eby ........................ | G06F 40/284 |
| 2024/0320251 | A1 * | 9/2024 | Hemington ........... | G06F 16/338 |
| 2024/0362497 | A1 * | 10/2024 | Grenader ............. | G06N 3/0455 |
| 2024/0394291 | A1 * | 11/2024 | Nelson ................... | G06F 40/30 |
| 2025/0061137 | A1 * | 2/2025 | Higgins ................ | G06F 16/383 |
| 2025/0165752 | A1 * | 5/2025 | Lovric ................... | G06N 20/00 |
| 2025/0190454 | A1 * | 6/2025 | Patil ..................... | G06F 16/3326 |
| 2025/0209269 | A1 * | 6/2025 | Bhardwaj .............. | G06F 40/40 |
| 2025/0232567 | A1 * | 7/2025 | Coleman ............. | G06V 10/774 |
| 2025/0272317 | A1 * | 8/2025 | Aggarwal ........... | G06F 16/3329 |

(Continued)

FOREIGN PATENT DOCUMENTS

| | | | | | |
|---|---|---|---|---|---|
| CN | 119005275 | A | * 11/2024 | ......... | G06F 15/7846 |

*Primary Examiner* — Hasanul Mobin
(74) *Attorney, Agent, or Firm* — ArentFox Schiff LLP; Michael Fainberg

(57) ABSTRACT

Disclosed herein are systems and methods for providing LLM embeddings. The method also includes receiving a query to a LLM service. The method also includes determining if a first embedding of the input query is provided by a main embedding model. The method further includes, based on a determination that the first embedding is provided by the main embedding model, identifying an embeddings cluster similar to the input query, and computing a main centroid embedding for the embeddings cluster based on the first embedding. The method further includes based on a determination that the first embedding is not provided by the main embedding model, identifying an embeddings cluster similar to the input query, and transmitting the main centroid embedding of the embeddings cluster to the LLM service.

20 Claims, 7 Drawing Sheets

100

(56) References Cited

U.S. PATENT DOCUMENTS

2025/0307238 A1 * 10/2025 Klein ................... G06N 3/0455
2025/0363334 A1 * 11/2025 Galvin ................ G06N 3/0455
2026/0017613 A1 * 1/2026 Okazaki .............. G06Q 10/103
2026/0030459 A1 * 1/2026 Mahgoub ................ G06F 40/58

* cited by examiner

500

PROVIDING LARGE LANGUAGE MODEL EMBEDDINGS USING CLUSTERS AND DICTIONARIES

FIELD OF TECHNOLOGY

The present disclosure relates to the field of machine learning models, and, more specifically, to systems and methods for providing large language model (LLM) embeddings using a fallback embedding model.

BACKGROUND

Embedding models are utilized by LLMs to provide a foundational way to represent language in a dense, continuous, and semantically rich vector space. These embeddings encode the relationships between words, phrases, or even entire documents, enabling LLMs to capture the nuances of meaning and context. By transforming discrete linguistic elements into mathematical representations, embedding models allow LLMs to perform complex tasks like understanding synonyms, polysemy, and contextual variations efficiently.

SUMMARY

To address the shortcomings when a main embedding model becomes temporarily down or unavailable, the present disclosure describes a system and method for implementing a fallback embedding model for embeddings generation. Some of the technical improvements of the technical disclosure is increased system reliability since continuous operation ensures that the system continues functioning even when the main embedding model is unavailable, avoiding complete service disruption. Another technical improvement is reduced downtime impact as users or downstream processes experience minimal interruption due to the fallback embedding model handling embedding generation as a backup or temporary measure. Yet another technical improvement of the technical disclosure is scalability and load balancing. For example, a fallback embedding model may handle some requests during peak load time or when the main model experiences bottlenecks. In this way, users or applications may continue to receive embeddings with potentially slightly reduced quality, but without interruptions. In fact, users may not even notice the switch to the fallback embedding model if it is well-integrated and sufficiently performant. Furthermore, a fallback embedding model often requires fewer computational resources, making it a cost-effective solution during temporary outages. By integrating a fallback embedding model, organizations ensure their embedding-dependent systems remain robust, user-focused, and cost-efficient, even in challenging situations.

In one exemplary aspect, a method for providing LLM embeddings is disclosed. The method includes: receiving an input query to a LLM service from a user; determining if a first embedding of the input query is provided by a main embedding model; based on a determination that the first embedding is provided by the main embedding model, identifying an embeddings cluster similar to the input query and computing a main centroid embedding for the embeddings cluster based on the first embedding; and based on a determination that the first embedding is not provided by the main embedding model, identifying an embeddings cluster similar to the input query and transmitting the main centroid embedding of the embeddings cluster to the LLM service.

In some aspects, the techniques described herein relate to a method, further comprising: based on a determination that the first embedding is provided by the main embedding model, storing the input query and its first embedding as corresponding entries in an embeddings dictionary; and based on a determination that the first embedding is not provided by the main embedding model, searching the embeddings dictionary for the input query and corresponding first embedding, based on a determination that the corresponding first embedding is found in the embeddings dictionary within a dictionary similarity threshold, sending the first embedding to the LLM service, and based on a determination that the corresponding first embedding is not found in the embeddings dictionary within the dictionary similarity threshold, identifying an embeddings cluster similar to the input query, and sending a centroid embedding of the embeddings cluster to the LLM service.

In some aspects, the techniques described herein relate to a method, wherein identifying an embeddings cluster similar to the input query further comprises: generating a second embedding for the input query using a fallback embedding model; providing a plurality of embeddings clusters, wherein each embeddings cluster comprises at least a secondary centroid embedding computed based on a plurality of second embeddings generated by the fallback embedding model, and a corresponding main centroid embedding computed based on a plurality of first embeddings generated by the main embedding model; and selecting, out of the plurality of embeddings clusters, an embeddings cluster similar to the second embedding within a cluster similarity threshold.

In some aspects, the techniques described herein relate to a method, wherein the dictionary similarity threshold or the cluster similarity threshold is determined based on a similarity metric between distances of two or more embedding vectors.

In some aspects, the techniques described herein relate to a method, wherein the similarity metric comprises one of: Jaccard similarity index and cosine similarity.

In some aspects, the techniques described herein relate to a method, wherein the fallback embedding model is different from the main embedding model.

In some aspects, the techniques described herein relate to a method, wherein the first embeddings and second embeddings have different vector dimensions.

In some aspects, the techniques described herein relate to a method, wherein the first centroid embedding comprises an average dot product of two or more embedding vectors.

In some aspects, the techniques described herein relate to a method, further comprising, broaden a scope of search by adjusting the cluster similarity threshold if no embeddings cluster similar to the second embedding was found within the plurality of embeddings clusters.

According to one aspect of the disclosure, a system is provided for providing LLM embeddings, the system including: at least one memory; and at least one hardware processor coupled with the at least one memory and configured, individually or in combination, to: receive an input query to a LLM service from a user; determine if a first embedding of the input query is provided by a main embedding model; based on a determination that the first embedding is provided by the main embedding model, identify an embeddings cluster similar to the input query, and compute a main centroid embedding for the embeddings cluster based on the first embedding; and based on a determination that the first embedding is not provided by the main embedding model, identify an embeddings cluster similar to the input query, and transmit the main centroid embedding of the embeddings cluster to the LLM service.

In one exemplary aspect, a non-transitory computer-readable medium is provided storing a set of instructions thereon for providing LLM embeddings, the system, including instructions for: receiving an input query to a LLM service from a user; determining if a first embedding of the input query is provided by a main embedding model; based on a determination that the first embedding is provided by the main embedding model, identifying an embeddings cluster similar to the input query, and computing a main centroid embedding for the embeddings cluster based on the first embedding; and based on a determination that the first embedding is not provided by the main embedding model, identifying an embeddings cluster similar to the input query, and transmitting the main centroid embedding of the embeddings cluster to the LLM service.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

Like reference numbers and designations in the various drawings indicate like elements.

DETAILED DESCRIPTION

Figure 1:
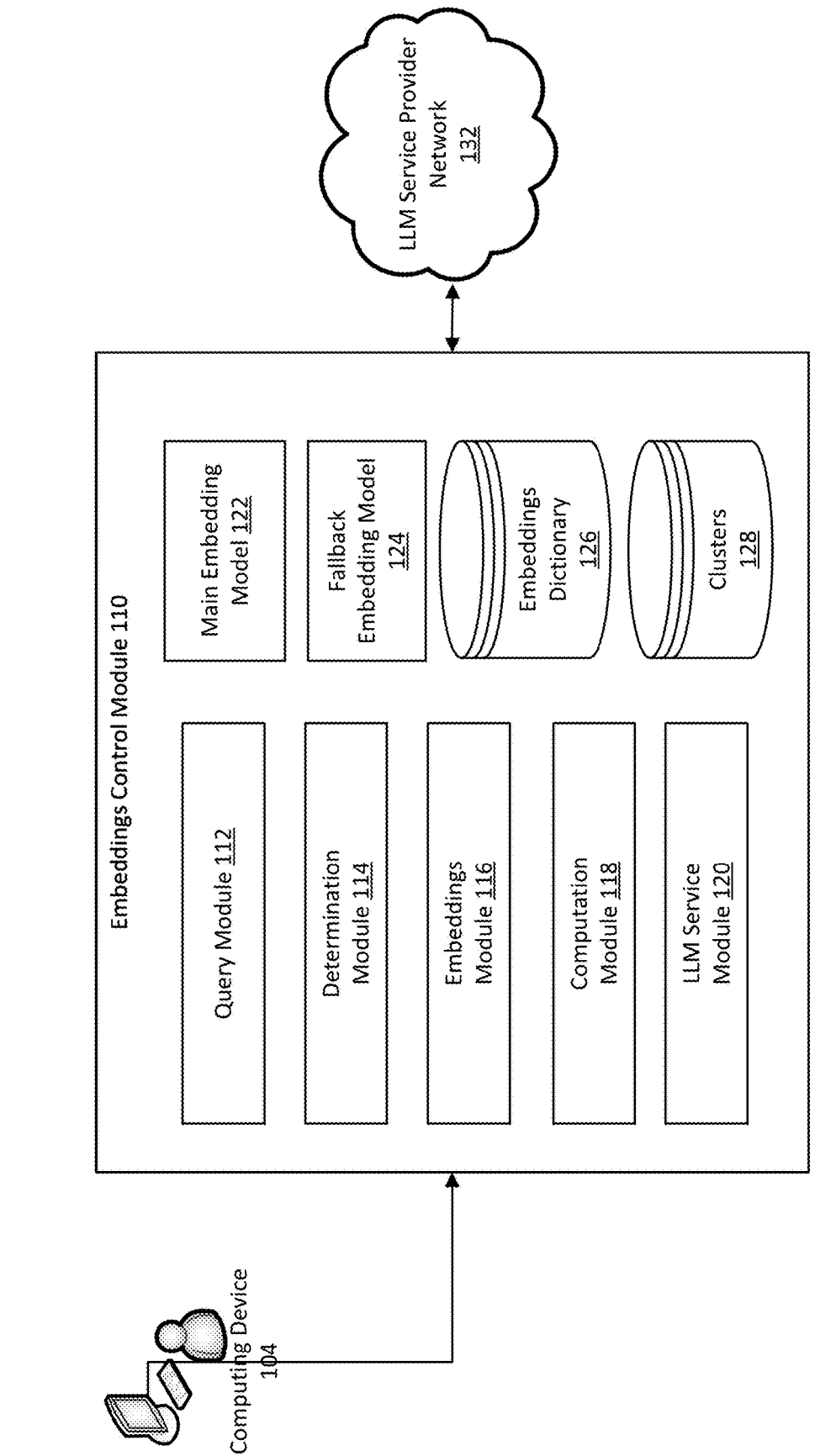
FIG. 1 is a block diagram illustrating a system for providing LLM embeddings using a fallback embedding model according to aspects of the present disclosure.

Exemplary aspects are described herein in the context of a system, method, and computer program product for providing Large Language Model (LLM) embeddings using dictionaries and clusters to train a fallback embedding model. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

LLM embeddings leverage dense vector representations to capture semantic relationships between words, phrases, or entire texts. These embeddings can be clustered to group similar concepts, allowing for efficient organization and retrieval of information. Clusters help identify inherent structures in data, enabling tasks like topic modeling, intent detection, or semantic search. Dictionaries complement clustering by providing a curated mapping of terms or concepts to their embeddings or clusters, ensuring interpretability and alignment with specific domains. Together, clustering and dictionaries enhance the utility of LLM embeddings, supporting scalable and precise applications in natural language processing and machine learning.

One of the key advantages of embedding models is their ability to reduce the dimensionality of language data while preserving its semantic structure. Traditional representations, like one-hot encodings, are sparse and computationally expensive, offering no insight into the relationships between different words. In contrast, embeddings cluster semantically similar items closer together, enabling LLMs to generalize and infer relationships across vast datasets. This compact representation not only saves computational resources but also enhances the model's ability to learn patterns and context effectively.

The key features of embeddings are dimensionality reduction, semantic similarity, and efficiency. The embeddings map high-dimensional data (e.g., sparse word counts, pixels) into lower-dimensional space, preserving important features. Semantic similarity refers to having similar items being closer in the semantic space. Embeddings enable efficient computation for downstream tasks (e.g., clustering, classification). Simply put, embedding models are foundational in modern artificial intelligence (AI), transforming raw data into structured representations that facilitate a wide range of machine learning tasks.

Embedding models also play a pivotal role in enabling LLMs to handle a wide range of tasks. For instance, embeddings empower LLMs to perform semantic search, recommendation, and clustering by leveraging vector similarity measures. They are equally indispensable for cross-lingual and multimodal applications, aligning language with other modalities like images or audio in a shared vector space. Pretrained embeddings further accelerate model training and transfer learning, providing a strong baseline of linguistic knowledge that can be fine-tuned for specific applications or domains.

However, if a main embedding model is unavailable or down, the functionality and performance of a LLM can be severely impacted, especially in tasks requiring semantic understanding, retrieval, or context-sensitive processing since the embedding model serves as the foundation for transforming textual input into dense vector representations that the LLM can interpret. Without embeddings, the LLM loses its ability to efficiently encode semantic relationships and context, resulting in degraded performance or complete failure in downstream tasks.

One immediate consequence of an unavailable embedding model is the disruption of systems that rely on real-time or near-real-time processing. Applications such as chatbots, semantic search engines, and recommendation systems may become unresponsive or return irrelevant results. These applications depend on the embedding model to map user queries or inputs into a meaningful vector space for comparison or inference. Without these embeddings, the LLM cannot perform similarity searches, contextual analysis, or content matching, rendering these systems ineffective. For example, if a main embedding model is unavailable, then a user may enter a query and a blank screen (e.g., no response) may appear.

Additionally, the absence of embeddings can lead to data backlogs in systems where processing pipelines depend on embedding generation. For instance, if embeddings are used as intermediate features for further classification, clustering, or model inputs, the inability to produce embeddings can stall the entire pipeline. This delay may cascade into other systems that depend on timely outputs, compounding the disruption and increasing recovery time once the embedding model is restored.

Accordingly, the present disclosure describes implementing a fallback embedding model configured to provide embeddings for the LLM service when a main embedding model is unavailable. In one aspect, when the main embedding model is operational, the fallback embedding model generates secondary embeddings for user queries, matches them to the corresponding main embeddings for the same queries, and stores the matching embeddings in a dictionary. In another aspect, the fallback embedding model also adds secondary embeddings and the corresponding main embeddings to various matching subject matter clusters, each cluster containing a secondary centroid embedding for the cluster and the corresponding main centroid embedding. Specifically, each secondary embedding and the corresponding main embedding are matched to a related subject matter cluster by measuring similarity between the secondary embedding and the secondary centroid embedding for the cluster. In another aspect, when the main embedding model is unavailable, the fallback embedding model generates an secondary embedding for a user query, (i) checks in the dictionary for a matching main embedding, and, if a matching main embedding is found, sends it to the LLM service, and/or (ii) checks in the subject matter clusters for a similar secondary centroid embedding, and, if a similar subject matter cluster is identified, sends the corresponding centroid main embedding for that cluster to the LLM service.

Turning now to the figures, example aspects are depicted with reference to one or more components described herein, where components in dashed lines may be optional.

FIG. 1 is a block diagram illustrating a system 100 configured to provide LLM embeddings using a dictionary and clusters. In one aspect, the components of system 100 may be implemented on computer systems, such as that shown in FIG. 6.

The system 100 may be used to implement a fallback embedding model for providing a secondary (e.g., fallback) LLM embeddings using clusters and dictionaries. Generally, the embeddings control module 110 is configured to generate a secondary embedding using a fallback embedding model 124 (e.g., secondary model) when a main embedding model 122 is unavailable. Embedding models are powerful tools for generating vector representations of textual, visual, or multimodal data. These models map inputs (e.g., text, images, or other data types) into dense, fixed-dimensional vectors in a high-dimensional space. The resulting embeddings capture semantic or contextual relationships, enabling efficient similarity comparisons, clustering, and information retrieval. For example, text embeddings generated from embedding models may be used to find semantically similar sentences, enhance search algorithms, or classify documents based on their content. Their versatility makes them fundamental in applications like recommendation systems, natural language processing tasks, and large-scale data analysis. As an example, the embeddings control module 110 may be hosted on a cloud server or allocated at a local device (e.g., such as the computing device 104).

In one aspect, the system 100 may include at least a computing device 104, an embeddings control module 110, and a LLM service provider network 132. The LLM service provider network 132 is a system of interconnected resources and platforms designed to deliver LLM-based capabilities to users and businesses. It typically includes cloud infrastructure for hosting and running the models, application programming interfaces (APIs) for seamless integration with various applications, and tools for fine-tuning and customizing models to specific use cases. These networks often support scalability, allowing users to process massive data or handle spikes in demand. By leveraging distributed computing and optimization techniques, the network ensures efficient delivery of advanced language understanding, generation, and interaction capabilities to a wide range of industries, from customer support to content creation.

In some aspects, the embeddings control module 110 may include a query module 112, a determination module 114, an embeddings module 116, a computation module 118, a LLM service module 120, a main embedding model 122, a fallback embedding model 124, an embeddings dictionary database 126, and a clusters database 128.

The embeddings control module 110 is configured to find related queries based on subject matter, generate embeddings for the queries, and define a cluster of these embeddings. In addition, the embeddings control module 110 is further configured to compute functions of these embeddings (e.g., find average dot product of embedding vectors, dot product of vectors, etc.) using a similarity metric to determine which queries relate to each other and fit one cluster. This provides a way to implement a fallback embedding model 124 configured to generate embeddings when a main embedding model is temporary down or unavailable.

The main embedding model 122 is a type of machine learning model (MLM), often used in natural language processing (NLP) and other domains, which performs embedding generation by transforming data (e.g., text, images, or graphs) into a continuous vector space. These vectors (e.g., embeddings) represent the essential characteristics of the input data in a way that preserves semantic or structural relationships. The main goal of an embedding model is to make data more accessible for computation and analysis by encoding it into a numerical format that machine learning algorithms can work with.

The fallback embedding model 124 is a supplementary system configured to generate embeddings when the main embedding model 122 is unavailable (e.g., being offline due to network issues, maintenance/repairs/updating, or cyberattack), fails to produce a result, or encounters issues like high latency or errors. The fallback embedding model 124 typically operates with simplified architecture or reduced computational requirements, ensuring that the system 100 remains operational under constrained conditions. The fallback embedding model 124 helps maintain service continuity by providing an approximate or less resource-intensive embeddings, ensuring that applications relying on embedding-based operations, such as search, recommendation, or classification, can continue functioning without significant disruption.

The computing device 104 may also execute a query module 112 configured to obtain a query (e.g., query 202 from FIG. 2, query 301 from FIG. 3) from a computing device 104 of a user. Generally, the query module 112 is configured to act as an intermediary layer in LLM-based systems by enhancing a LLM model's ability to understand, interpret, and respond to user queries effectively. Specifically, the query module 112 may be configured to handle and interpret the query and generate a prompt from the query that is formatted in a way that a LLM from the LLM service provider network 132 can process. The primary role of the query module 112 is to bridge the gap between raw user input from the computing device 104 and the LLM service provider network 132. In some aspects, the query module 112 may be equipped with natural language understanding for analyzing and interpreting the query to understand its intent, context, and meaning.

As an example, a user may use the computing device 104 to enter the query for input as a prompt into the LLM. In some aspects, the query module 112 may prepare the query as a prompt for input into the LLM on the LLM service provider network 132 by cleaning and normalizing the text. As an non-limiting example, this may involve: removing unnecessary punctuations, special characters, or stop words; correcting spelling or grammatical errors; or converting different forms of data (e.g., dates, numbers, or units) into a standardized format. By identifying the user's intent behind the query (e.g., asking a question, requesting information, or performing a task), the query module 112 ensure that the LLM from the LLM service provider network 132 may determine the appropriate type of response or action.

The computing device 104 may execute a determination module 114 configured to assess whether an embedding of the input query is generated dynamically by a main embedding model 122 or retrieved from a embeddings dictionary database 126. The determination module 114 operates by comparing the query against indexed embeddings in the embeddings dictionary database 126 for matches or near-matches according to a predefined dictionary threshold. If no suitable embedding is found, then the determination module 114 invokes the main embedding model 122 to generate one. This approach is helpful because it optimizes system performance by reusing existing embeddings for frequently encountered queries, reducing computational overhead. At the same time, it ensures flexibility by leveraging the main embedding model 122 for novel or complex inputs, maintaining the accuracy and robustness of the system 100.

In some aspects, the computing device 104 may execute a determination module 114 configured to determine if an embedding of the input query is provided by a main embedding model 122 and whether the embedding is found in the embeddings dictionary database 126. This process verifies that the input query is properly represented in the feature space defined by the model, enabling meaningful comparisons or operations. Additionally, checking the embeddings dictionary ensures that precomputed embeddings are efficiently reused, reducing computational overhead and maintaining alignment with the system's predefined embedding resources.

The computing device 104 may execute an embeddings module 116 configured to identify an embeddings cluster similar to the input query. Clustering embeddings allows for grouping similar items or concepts in the feature space, making it easier to detect patterns and relationships. By pinpointing the cluster most aligned with the input query, the system can infer relevant associations, provide targeted suggestions, or enhance decision-making processes.

In some aspects, the embeddings module 116 may identify that the embeddings cluster is similar to the input query by leveraging similarity metrics (e.g., Jaccard similarity or cosine similarity) to compare the query's embedding against clusters of embeddings stored in a database or memory (e.g., the embeddings dictionary database 126). The embeddings module 116 analyzes the spatial relationships in the embedding space to locate the most semantically aligned cluster. This functionality is helpful as it enables the system 100 to group related queries or data points efficiently, facilitating tasks like recommendation, content categorization, and semantic search. By operating at the cluster level, it reduces computational complexity and enhances scalability, ensuring faster and more accurate results for large-scale applications.

In some aspects, the computing device 104 may execute the embeddings module 116 to store an input query and its corresponding first embeddings as entries in the embeddings dictionary database 126. Upon generating the embedding for a new query, the embeddings module 116 saves this data pair for indexing it for future reference. This approach is helpful because it eliminates the need to recompute embeddings for identical or highly similar queries in subsequent interactions, thereby reducing latency and computational costs. By maintaining an efficiently structured embeddings dictionary database 126, the system 100 enhances performance, particularly in applications like search engines, recommendation systems, and natural language processing pipelines, where speed and scalability are crucial. More detail about the embeddings dictionary database 126 will be shown in FIG. 4A.

In some aspects, the computing device 104 may execute the embeddings module 116 to search the embeddings dictionary database 126 for the input query and corresponding first embedding. In some aspects, the embeddings module 116 may employ efficient lookup mechanisms, such as hash-based indexing or approximate nearest neighbor (ANN) search. When an input query is received, the embeddings module 116 scans the embeddings dictionary database 126 to locate a pre-existing entry that matches or closely aligns with the query's embedding. If a match is found, the corresponding embedding is retrieved for use.

In some aspects, the computing device 104 may execute the embeddings module 116 to send the first embedding to the LLM service within the LLM service provider network 132. In some cases, the embeddings module 116 may send the first embedding to the LLM service by establishing a secure connection and transmitting the embedding data via API calls or other communication protocols. Once the first embedding is generated or retrieved, the embeddings module 116 may format the embeddings according to the requirements of the LLM service, ensuring compatibility for downstream processing. This interaction enables the LLM service to leverage the embedding for tasks like query expansion, context enrichment, or generating advanced responses. Sending embeddings to the LLM service facilitates seamless integration between local modules and remote services, enhancing system capabilities while offloading complex computations to a specialized provider.

In some aspects, the computing device 104 may execute the embeddings module 116 to identify an embeddings cluster similar to the input query and send a centroid embedding of the embeddings cluster to the LLM service of the LLM service provider network 132. Once a matching cluster is located, the embeddings module 116 calculates or retrieves the centroid embedding-a representative vector summarizing the cluster's key characteristics. This centroid embedding is then sent to the LLM service in the LLM service provider network 132 via secure communication protocols, enabling the LLM service to process the cluster-level representation for tasks like generating generalized insights or recommendations. This approach reduces the computational burden of processing individual embeddings while maintaining semantic relevance, improving efficiency and scalability.

In some aspects, the embeddings module 116 is configured to: generate a second embedding for the input query using a fallback embedding model 124; provide a plurality of embeddings clusters, wherein each embeddings cluster comprises at least a secondary centroid embedding computed based on a plurality of second embeddings generated by the fallback embedding model 124 and a corresponding main centroid embedding computed based on a plurality of first embeddings generated by the main embedding model; and select, out of the plurality of embeddings clusters, an embeddings cluster similar to the second embedding within a cluster similarity threshold. In some aspects, the embeddings module 116 is configured to adjust the similarity threshold if no embeddings cluster similar to the second embedding was found within the plurality of embeddings clusters to broaden a scope of search. In some aspects, the cluster similarity threshold for cluster matching may be approximately 80%.

The computing device 104 may execute a computation module 118 configured to compute a first centroid embedding for the embeddings cluster of the first embeddings. For example, the computation module 118 may compute the first centroid embeddings for the embeddings cluster by aggregating the individual embeddings within the cluster, including the first embedding, using mathematical techniques such as averaging, weighted combination, Matrix-Factorization-based Centroid, K-means or K-Medoids, Principal Component Analysis (PCA), soft clustering or expectation-maximization (EM), convex hull centroid, robust regression centroid, spherical or hyperbolic embedding mean, or manifold learning centroid. This computed centroid serves as a representative vector that encapsulates the collective semantic essence of the cluster. This process is important because it simplifies the representation of large or complex datasets, enabling efficient processing and comparison at the cluster level. By using a centroid embedding, the system 100 can perform tasks like semantic search, clustering analysis, and recommendation generation with improved speed and scalability while preserving meaningful relationships in the data.

In some aspects, the computing device 104 may execute a computation module 118 configured to transmit the first centroid embedding of the embeddings cluster to the LLM service from the LLM service provider network 132. For example, the computation module 118 may transmit the first centroid embedding of an embeddings cluster to the LLM service within the LLM service provider network 132 by utilizing secure and efficient data transmission protocols, such as API calls or network interfaces. Once computed, the centroid embedding is sent as a compact and semantically rich representation of the cluster.

The computing device 104 may execute a LLM service module 120 configured to interact with the LLM service provider network 132 by transmitting a prompt generated by the query module 112 for input into the LLM from the LLM service provider network 132 and to obtain responses from the LLM service provider network 132. Generally, the LLM service module 120 is responsible for managing the interactions between the LLM service provider network 132 and modules from the embeddings control module 110. The primary function of the LLM service module 120 is to handle the exchange of data between the embeddings control module 110 and the LLM service provider network 132 to ensure that the inputs and output of the LLM are effectively communicated to the appropriate destinations. This module serves as the interface layer that facilitates communication to enable the LLM service module 120 to integrate into the system 100.

In some aspects, the LLM service module 120 is configured to provide an API that the embeddings control module 110 utilizes to interact with the LLM service provider network 132. As a non-limiting example, this may include handling API requests and responses from the LLM service provider network 132, managing authentication and authorization for secure access, or supporting different API protocols (e.g., REST, WebSocket) to accommodate various integration needs.

In some aspects, the LLM service module 120 may be configured to integrate with internal and/or external systems and databases such as the embeddings dictionary database 126 and clusters database 128. This may involve fetching additional data needed to answer a query or enabling bidirectional communication between the LLM service module 120 and external systems (e.g., CRM software, knowledge bases, or real-time data feeds). More details about the clusters database 128 will be shown in FIG. 4B.

It should be noted that the generation of embeddings and calculation of centroids described in the present disclosure are heavily simplified. One skilled in the art will appreciate that the embedding models utilized may have significantly large datasets with highly specific details. This type of analysis would be beyond the capabilities of the human mind because the amount of data to be identified, considered, and processed is unfathomable.

Figure 2:
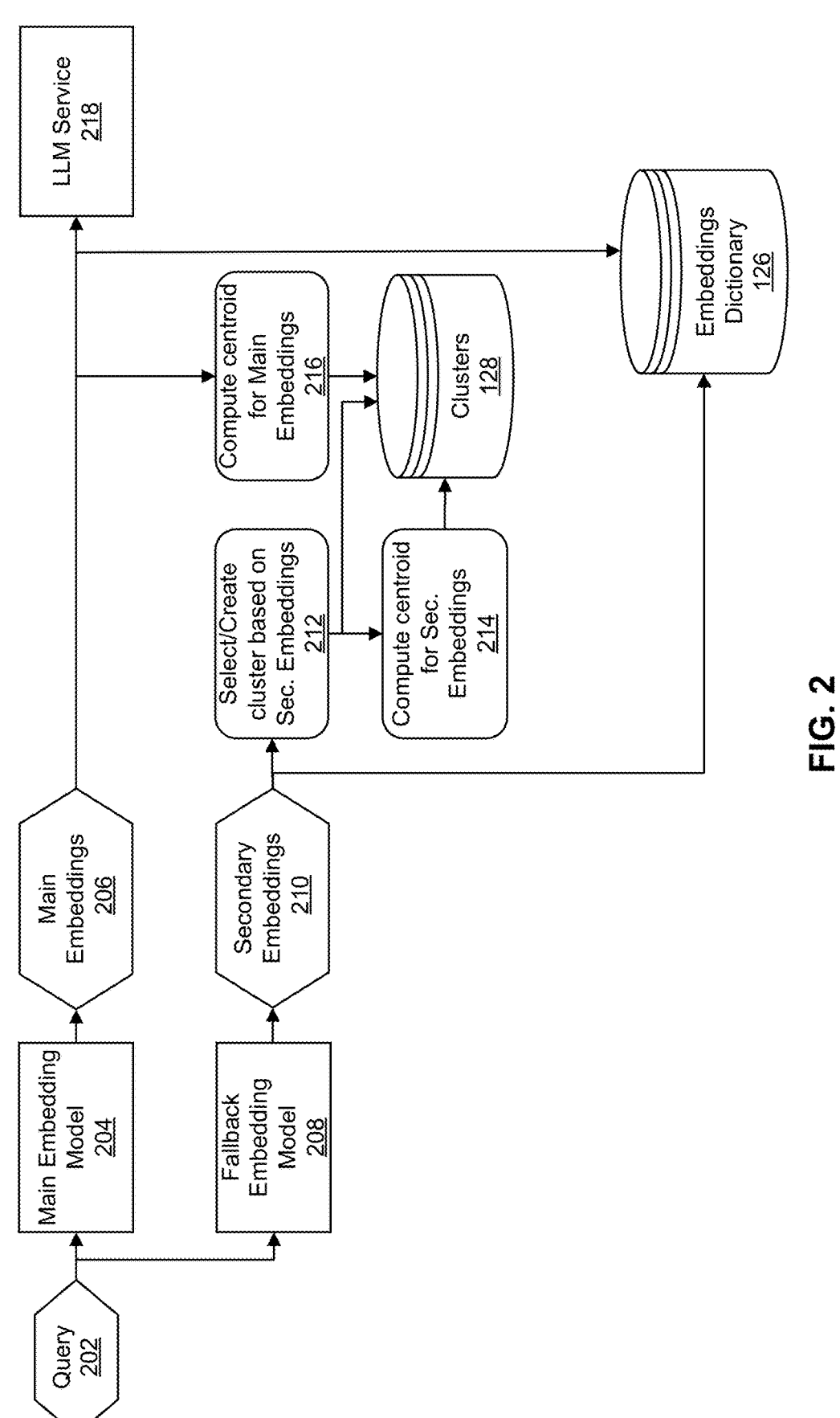
FIG. 2 is a block diagram illustrating a system for executing a main embedding model while training the fallback embedding model and generating dictionaries and embeddings clusters according to aspects of the present disclosure.

FIG. 2 is a block diagram illustrating a process of operation of the system 200 for executing a main embedding model while training the fallback embedding model and generating dictionaries and clusters of embeddings according to aspects of the present disclosure. The fallback embedding model has a different dimensionality than the main embedding model.

Generally, when using embedding techniques for information retrieval, embeddings are created for queries—the queries (e.g., any form of text input including documents) are embedded beforehand to build a searchable index, while the query 202 is then converted into an embedding to compare against the query embeddings and to find the most relevant results based on semantic similarity. When a user submits an input query 202, it is converted into an embedding vector to facilitate comparison with the query embeddings in the database. Both types of embeddings are needed because by using embeddings, queries that are semantically similar to a previous query may be found in an embeddings dictionary database 126 even if they do not contain the exact keywords. Accordingly, once queries are pre-embedded, searching for relevant queries becomes much faster by comparing the query embeddings against a large set of query embeddings.

As shown in system 200, a main embedding model 204 processes the input query 202 (e.g., a few words, a sentence, a paragraph or a document) to generate a main embeddings 206 of the input query 202. In some aspects, the main embedding model 204 is provided by or associated with the LLM service 218 and provides embeddings in a "native"

dimensionality of the LLM. "Native" dimensionality implies that the embedding vectors produced by the LLM model matches the dimensional requirements or preferences of the associated LLM service 218. Using the native dimensionality ensures optimal performance as the embeddings are tailored to work seamlessly with the LLM without the need for additional transformations or dimensionality reductions.

Specifically, the main embedding model 204 processes the input query 202 by transforming its content into a dense numerical representation (e.g., embeddings) within a high-dimensional vector space. This transformation captures semantic relationships between words, phases, or entire sections of the input query 202. The main embedding model 204 typically tokenizes the text into smaller components, such as words or sub-words, and maps these to vectors using learned parameters. By aggregating these vectors, the main embedding model 204 creates a holistic embedding for the input query 202 that encodes its meaning, context, and structure. These embeddings can then be used for down-stream tasks such as inference, dictionary building, similarity comparison and clustering.

Figure 4A:
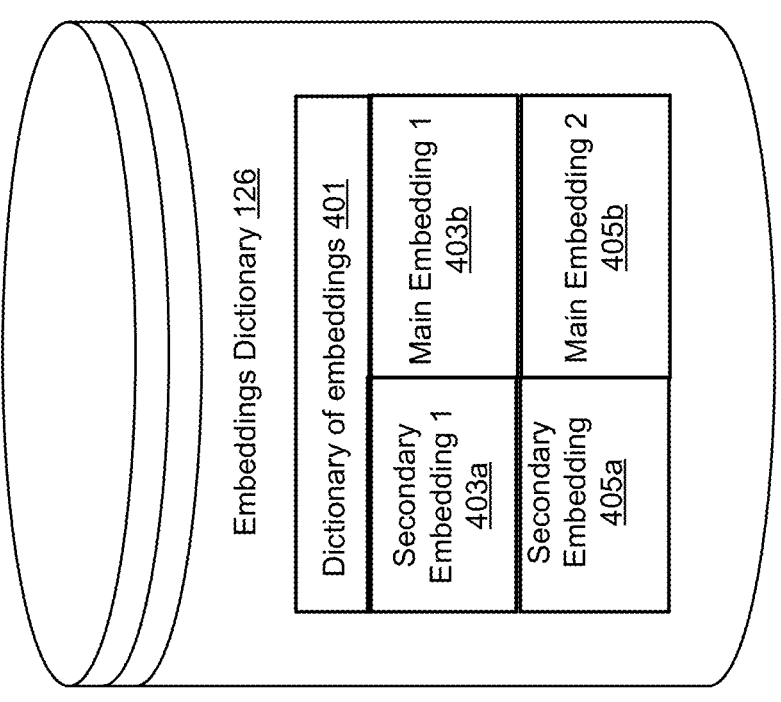
FIG. 4A is an example of an embeddings database according to aspects of the present disclosure.

The LLM from a LLM service 218 then uses the main embeddings 206 from the main embedding model 204 as a foundational mechanism to understand and process textual data effectively. The main embeddings 206, which are dense numerical vectors representing words, phrases, or entire documents, serve as a encoding that captures the semantic meaning and contextual relationships in the queries 202. In particular, the LLM service 218 then uses main embeddings 206 to perform inference and respond to the queries 202. The main embeddings 206 also help group similar texts or classify them into predefined categories based on their proximity in the embedding space. Before a centroid is found, the main embedding are grouped into clusters and also stored individually into the embeddings dictionary database 126 along with the corresponding secondary embeddings, as shown in FIG. 4A.

Main embeddings 206 are also used to compute a centroid for the main embeddings 216 by aggregating their vector representations into a single, central point that represents the average or most representative embedding in the group in order to define a cluster of the main embeddings. This is done by summing all the embeddings element-wise across their dimensions and dividing the result by the total number of embeddings to calculate the mean vector. In some aspects, a first centroid embedding comprises an average or average dot product of two or more embeddings. The resulting centroid captures the shared semantic properties of the embeddings, serving as a compact summary of their collective meaning and stores them in the clusters database 128. This centroid is useful for tasks like clustering, similarity analysis, and summarization, where it acts as a representative point for the group of embeddings.

The clusters database 128 that includes clusters with centroids derived from both the fallback embedding model 208 and the main embedding model 204 is significant for ensuring comprehensive and accurate clustering across diverse data inputs. The centroid from the fallback embedding model 208 provides a robust reference point for cases where the main embedding model 204 may lack representation, while the centroid based on the main model's embeddings ensures high fidelity and precision in feature-rich contexts. By maintaining both centroids, the system can bridge potential gaps between models, align clustering outcomes, and enable smooth transitions between fallback and main model-based analyses, ultimately enhancing reliability and performance in handling complex or varied datasets. The clusters database 128 will be described in more detail in FIG. 4A.

Similar to the main embedding model 204, a fallback embedding model 208 takes the input query 202 and generates a secondary embedding 210 to be stored in the embeddings dictionary database 126 and for selecting or creating a cluster based on the secondary embeddings 212. At a high level, the clustering includes finding related queries based on subject matter to generate embeddings for these queries and define a cluster of these embeddings. As a non-limiting example, similar queries in a same cluster may include queries such as: Explain Ohm's law? How does Ohm's law work? What is Ohm? Who is Georg Ohm? How is electricity measured? What is the relationships between current and voltage? Explain V=IR. How is electrical resistance is measured? How is resistance is measured? What are the units of electrical resistance? What are basic elements of electric circuit? Explain principles of electrical conductivity. What does multimeter measure? What does Greek letter omega represent? What is the name of German scientist who studied electricity?

In some aspects, when a secondary embedding 210 is created for the first time, then the secondary embedding 210 is stored directly in the clusters database 128. In some aspects, when an additional secondary embedding is generated, then the additional secondary embedding is compared with all the clusters in the clusters database 128 and a cluster that has the most similar secondary embedding based on a cluster similarity threshold is identified. Next, the additional secondary embedding and the existing secondary embeddings are combined and an updated centroid is computed and updated in the clusters database 128 based on the additional secondary embeddings such that the identified cluster will be designated by thew updated centroid.

After selecting or creating the cluster based on the secondary embedding 212, a centroid is computed for the secondary embeddings 214 and stored in the clusters database 128. As will be described in more detail in FIG. 4B, this generates a clusters database 128 that comprises a clusters 407a, 407b, 407c along with a centroid based on the secondary embedding 409a, 409b, 409c, and a centroid based on a main embeddings 411a, 411b, 411c. In this way, the fallback embedding model may be prepared while the main embedding model is executed.

The main embeddings 206 and the secondary embeddings are also stored in an embeddings dictionary database 126. As will be described in more detail in FIG. 4A, the embeddings dictionary database 126 contains a dictionary of embeddings 401 that includes secondary embeddings 403a, 405a and a corresponding main embedding 403b, 405b for each input query 202.

The embeddings dictionary database 126 is critical for robustness and flexibility in various computational tasks. The fallback embedding model 124 ensures that embeddings are available, maintaining system continuity and minimizing data gaps. By linking these secondary embeddings 210 to the main embeddings 206 from the main embedding model 204, the embeddings dictionary database 126 facilitates seamless integration and comparison, enabling consistent processing, improved generalization, and enhanced accuracy across diverse inputs. This dual-model setup ensures comprehensive coverage and adaptability, particularly in dynamic or heterogeneous data environments. The embeddings dictionary database 126 will be described in more detail in FIG. 4B.

Figure 3:
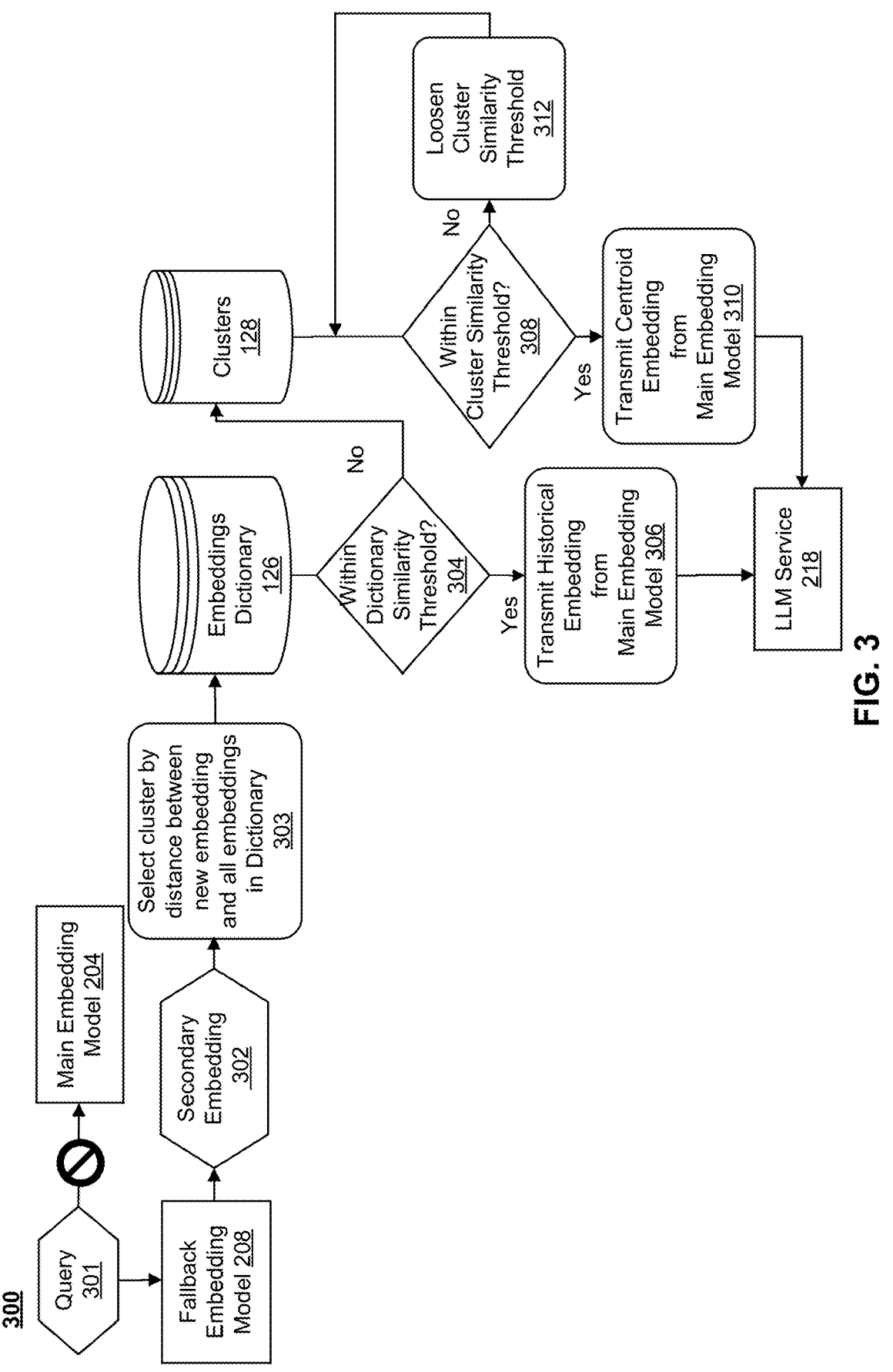
FIG. 3 is a block diagram illustrating a system for executing the fallback embedding model to generate secondary embeddings when the main embedding model is unavailable according to aspects of the present disclosure.

FIG. 3 is an example method for providing LLM embeddings using a fallback embedding model when the main embedding model is unavailable according to aspects of the present disclosure. The method 300 describes an "emergency-mode" scenario, where the fallback embedding model 208 is used to generate a response for the LLM service 218 based on using historical embeddings from a main embedding model 306 or a centroid embedding form the main embedding model 306 when the embedding model 204 is offline or temporarily unavailable. Although the fallback embedding model 208 may not have provide as high quality embeddings as compared to the main embedding model 204, the fallback embedding model 208 provides a temporary solution when the main embedding model 204 is unavailable.

First, the method 300 includes determining that the main embedding model 204 is unavailable. The method 300 then generates a new secondary embeddings 302 from the input query 301 using the fallback embedding model 208.

Next, at 303, the method 300 selects a cluster based on a distance selected between the new secondary embeddings 302 and the previous embeddings stored in the embeddings dictionary database 126. The distance between the main embeddings and secondary embeddings is a measure of how "close" or "similar" two embedding vectors are in the high-dimensional space where they reside. Embedding vectors are numerical representations of items (like words, sentences, images, etc.), and their distance reflects their semantic or contextual similarity. The choice of distance metric depends on the application and the nature of the embeddings.

At, 304, the method 300 determines whether the new secondary embedding 302 is found within the embeddings dictionary database 126 according to a dictionary similarity threshold. In some aspects, the dictionary similarity threshold may correspond to a 90% match. When the new secondary embedding 302 and one of the main embeddings in the embeddings dictionary database 126 are within a similarity threshold, it means that the new secondary embedding 302 and an identified main embedding are considered to be sufficiently similar in their meaning or characteristics (e.g., as measured by a similarity metric).

Based on a determination that the new secondary embedding 302 corresponds to a main embedding in the embeddings dictionary database 126 according to the dictionary similarity threshold, the corresponding historical main embedding is selected and transmitted to the LLM service 218. Historical embeddings may have been saved by the main embeddings model 204 for several reasons including, but not limited to, version control/model auditing, backward compatibility, consistency in long-term analysis, or any other reasons. Accordingly, the LLM service 218 may leverage these historical embeddings to answer queries when the main embedding model 204 is unavailable.

Based on a determination that the new secondary embedding 302 does not correspond to any main embeddings in the embeddings dictionary database 126, the method 300 includes identifying an embeddings cluster similar to the input query 301 in the clusters database 128. Specifically, the method 300 includes searching the clusters database 128 for any clusters that are within a cluster similarity threshold 308. The clusters similarity threshold is looser than dictionary similarity threshold. In some aspects, the clusters similarity threshold may correspond to a 70% match. Specifically, the input query 301 is compared with the secondary centroid for each cluster to see if it is within the cluster similarity threshold. The idea is that the query 301 may be matched into at least one cluster (e.g., clusters 1 407a, cluster 2 407b, cluster 3 407c) in order to provide a response to the query 301.

Based on a determination that a cluster in the clusters database 128 is identified as being within the cluster similarity threshold, then a centroid embedding from the main embedding model 310 for the identified cluster is transmitted to the LLM service 218. In this way, the centroid embedding from the main model 310 from the cluster may be used to query the LLM instead of the main embeddings, which are unavailable due to the main embedding model 204 being down. Using the centroid embedding from the main embedding model 204 is a strategy used in machine learning for clustering and natural language processing (NLP) to interact with the LLM service 218. In clustering, a centroid represents the center point of a cluster, typically calculated as the mean or average of the data points within the cluster in a multi-dimensional space. W Based on a determination that a cluster in the clusters database 128 is not identified as being within the cluster threshold, then, at 312, the method 300 may include lowering (e.g., loosening) the cluster similarity threshold in order to broaden the scope of search when identifying an embeddings cluster similar to the input query 301 in the clusters database 128. Although, lowering the cluster similarity threshold may reduce the accuracy of the response, at least some response will be provided (e.g., as opposed to not providing any response at all).

FIG. 4A is an example of an embeddings database according to aspects of the present disclosure. The example 400a shows a embeddings dictionary database 126 that is configured to store both secondary embeddings 403a, 405a and main embeddings 403b, 405b in an embeddings dictionary 401. As shown in FIG. 4A, the embeddings 401 dictionary may contain embeddings (e.g., vectors) generated by both a fallback model and embeddings generated by a main embeddings model. Main embeddings are typically derived from a primary model, offering high accuracy and contextual relevance. However, in cases where the main model cannot generate an embedding-such as due to limitations in handling certain inputs-secondary embeddings are utilized as an alternative. These secondary embeddings, generated using a fallback embedding model, ensure the system remains robust and comprehensive. By integrating both types of embeddings in the dictionary, the embeddings dictionary database 126 achieves a balance between reliability and quality, enabling seamless downstream applications.

Figure 4B:
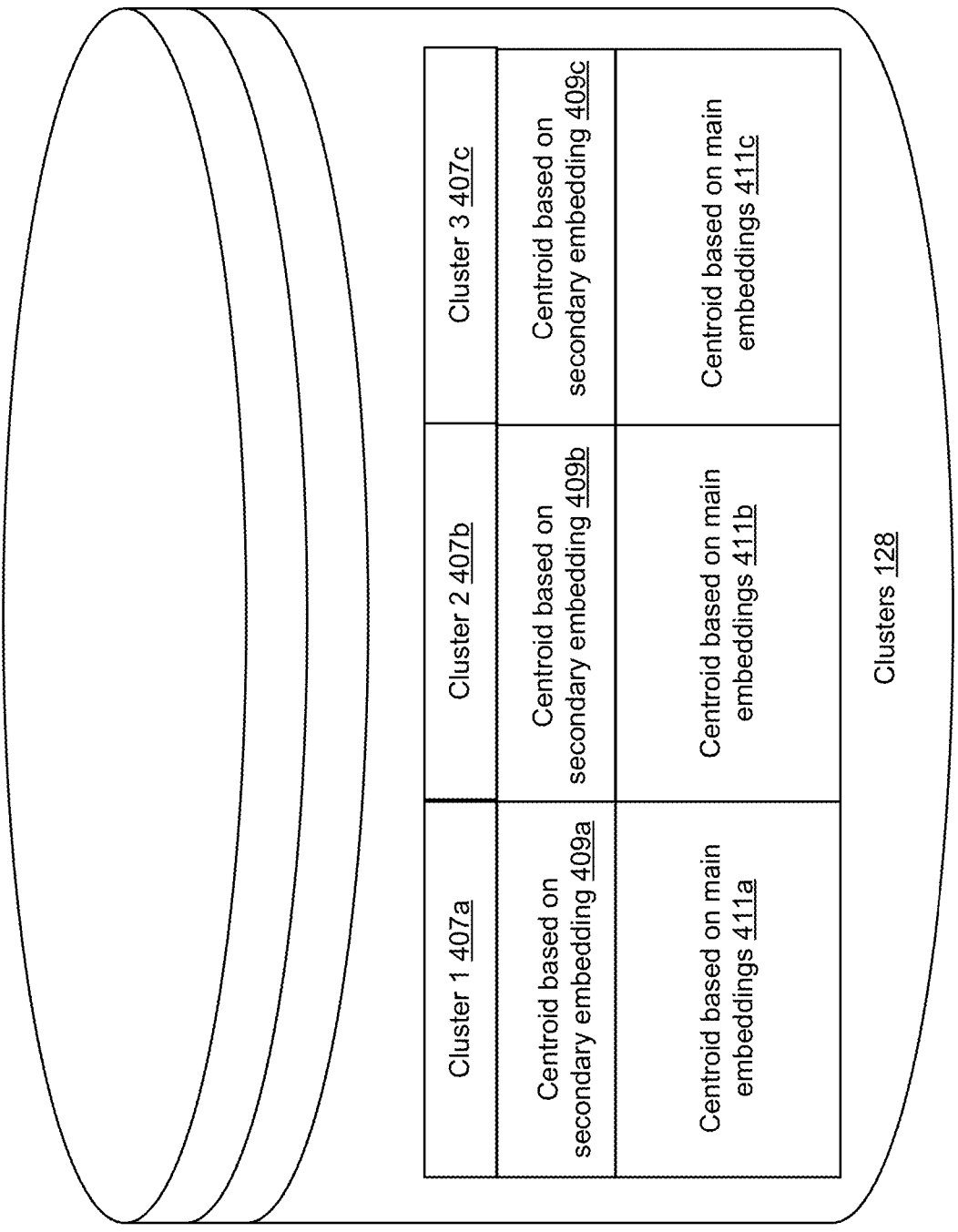
FIG. 4B is an example of a clusters database according to aspects of the present disclosure.

FIG. 4B is an example of a clusters database according to aspects of the present disclosure. The example 400b shows a clusters database 128 configured to store clusters and their associated computed centroid (e.g., average embeddings) based on secondary embeddings and main embeddings. The purpose of the centroid embeddings is to provide a concise, representative summary of a group of embeddings, often corresponding to a cluster of similar data points. These average embeddings are typically calculated by taking the mean of all individual embeddings in a cluster. The benefits of average embeddings include reducing the complexity of handling individual embeddings by consolidating a cluster into a single representative vector. In addition, they enable quick similarity or distance computations, as comparisons can be made directly with the centroid instead of each embedding within the cluster. By averaging, the impact of outliers and noise in individual embeddings is mitigated, resulting in a more stable and robust representation.

In some aspects, each cluster (e.g., cluster 1 407a, cluster 2 407b, cluster 3 407c) may represent a particular subject (e.g., biology, mathematics, physics, etc.). Accordingly, each cluster includes a centroid embedding calculated from the secondary embeddings produced by the fallback embedding model and a corresponding average centroid embedding computed from the main embeddings. This dual representation ensures that the clusters database captures the essence of the data both from the fallback model's perspective and the main model's perspective, enabling more robust analysis and better alignment across different embedding sources.

Computing centroid embeddings involves combining multiple embedding vectors, often representing various entities or data points, into a single representative vector. This is achieved by calculating the average or performing a dot product operation among the given embedding vectors. The average method generates a centroid that balances the contributions of all included vectors, creating a mean representation in the embedding space. Alternatively, the dot product emphasizes pairwise interactions, producing a vector influenced by the relational magnitudes between embeddings. Both approaches aim to distill the shared characteristics of the original embeddings into a unified representation.

Figure 5:
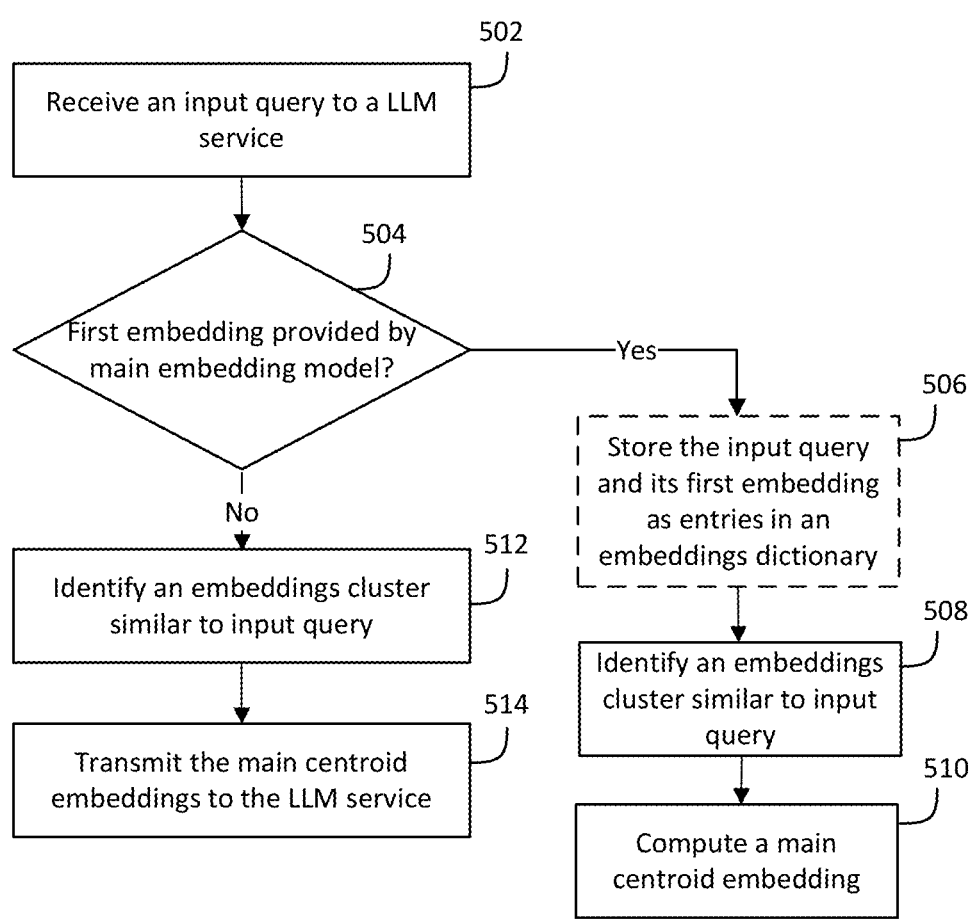
FIG. 5 is an example method of providing LLM embeddings according to aspects of the present disclosure.

FIG. 5 is an example method for providing LLM embeddings according to aspects of the present disclosure. In various implementations, the method 500 is performed by a device with one or more processors and non-transitory memory that performs intent prediction. In some implementations, the method 500 is performed by processing logic, including hardware, firmware, software, or a combination thereof. In some implementations, the method 500 is performed by a processor executing code stored in a non-transitory computer-readable medium (e.g., a memory). The method 500 describes a method for providing LLM embeddings using clusters and dictionaries.

At 502, the method 500 may include receiving an input query to a LLM service.

At 504, the method 500 may include determining whether a first embedding is provided by a main embedding model. Main embedding models often serve as a standardized or authoritative source for generating embeddings, typically trained on large, diverse datasets to capture generalizable semantic relationships.

Based on a determination that the first embeddings is not provided by the main embedding model, at 512, the method 500 may include identifying an embeddings cluster similar to the input query. By matching the input query to a cluster of semantically similar embeddings, the method 500 can leverage pre-grouped data to quickly surface meaningful results or insights. This approach enhances performance by narrowing the scope to relevant data, improves scalability in large datasets, and ensures that responses are contextually aligned with the query's intent. In addition, at 514, the method 500 may include transmitting the main centroid embedding of the embeddings cluster to the LLM service.

In some aspects, the first centroid embedding comprises an average or average dot product of two or more embedding vectors. This centroid is computed as the average or central point of all embeddings in the cluster and represents the collective semantic meaning or feature set of the cluster. The LLM can use the centroid embedding to perform tasks like summarizing the cluster, generating insights, or responding to queries about the overall meaning or intent of the cluster. Instead of analyzing individual data points, the LLM processes the centroid, which represents the group as a whole, ensuring that responses are generalized and contextually relevant to the cluster.

Based on a determination that the first embedding is provided by the main embedding model, optionally, at 506, the method 500 may include storing the input query and its first embedding as corresponding entries in an embeddings dictionary. In addition, at 508, the method 500 may include identifying an embeddings cluster similar to the input query, and, at 510, the computing the first centroid embeddings.

In some aspects, based on a determination that the first embeddings is not provided by the main embedding model, the method 500 may include searching the embeddings dictionary for the input query and corresponding first embedding.

In some aspects, based on a determination that the corresponding first embedding is found in the embeddings dictionary within a dictionary similarity threshold, the method 500 may include sending the first embedding to the LLM service.

In some aspects, based on a determination that the corresponding first embedding is not found in the embeddings dictionary within the dictionary similarity threshold, the method 500 may include identifying an embeddings cluster similar to the input query, and sending a centroid embedding of the embeddings cluster to the LLM service.

In some aspects, identifying an embeddings cluster similar to the input query further includes: generating a second embedding for the input query using a fallback embedding model; providing a plurality of embeddings clusters, wherein each embeddings cluster comprises at least a secondary centroid embedding computed based on a plurality of second embeddings generated by the fallback embedding model, and a corresponding main centroid embedding computed based on a plurality of first embeddings generated by the main embedding model; and selecting, out of the plurality of embeddings clusters, an embeddings cluster similar to the second embedding within a cluster similarity thresholds.

In some aspects, the fallback embedding model is different from the main embedding model. In some aspects, the first embeddings and second embeddings have different vector dimensions.

In some aspects, the dictionary similarity threshold or the cluster similarity threshold is is determined based on a similarity metric between distances of two or more embedding vectors. In some aspects, adjusting the similarity threshold if no embeddings cluster similar to the second embedding was found within the plurality of embeddings clusters to broaden a scope of search, which may reduce accuracy of responses, but will provide a response rather than providing no response. The similarity metric (such as cosine similarity, Jaccard similarity index, Euclidean distance, or dot product) quantifies the relationship between vectors by assessing their spatial or angular proximity in the embedding space. By calculating and comparing these distances, the metric provides a measure of how closely the second embedding aligns with the overall characteristics of the selected cluster, facilitating meaningful insights into their contextual or semantic relationships.

In some aspects, the similarity metric comprises one of: Jaccard similarity index and cosine similarity. The Jaccard Similarity Index, also known as the Jaccard coefficient, is a statistical measure used to evaluate the similarity between two sets. It is defined as the size of the intersection of the sets divided by the size of their union, providing a score between 0 and 1. A score of 1 indicates that the sets are identical, while 0 signifies no overlap. The Jaccard index is especially useful for comparing binary or categorical data, such as in text analysis, clustering, or evaluating the similarity of item recommendations. Its simplicity and intuitive interpretation make it a popular choice for analyzing set-based relationships.

Cosine similarity is a metric used to measure the similarity between two vectors by calculating the cosine of the angle between them. It is particularly useful for high-dimensional data, such as text or embeddings, as it focuses on the direction of the vectors rather than their magnitude. The similarity score typically ranges from 0 to 1 in practical applications involving text or embeddings, where 1 indicates perfect alignment and 0 indicates orthogonality (no similarity) . . . . Cosine similarity is widely used in applications like natural language processing, recommendation systems, and clustering, where the relative orientation of data points is more meaningful than their absolute values.

As an example, for a cosine similarity, a similarity value closer to 1 or within a predefined threshold indicates that the two embeddings are highly similar. Following on the example, if the similarity threshold is set to 0.8 (in a cosine similarity scale of 0 to 1), then main and secondary embeddings with a similarity score of 0.8 or higher are deemed similar. Accordingly, if embeddings are within the similarity threshold, the items they represent (e.g., sentences, words, images) likely share a similar meaning or context. For example, in NLP, embeddings for "car" and "automobile" would fall within a high similarity threshold because they have synonymous meanings. In clustering tasks, embeddings within the threshold might belong to the same cluster or category, indicating a grouping of similar concepts or entities. In some aspects, this threshold is often used to filter or retrieve relevant results. For example, in a recommendation system, secondary embeddings that are within the threshold of the main embedding of a user's preferences are selected as recommendations in lieu of the main embeddings being absent.

Figure 6:
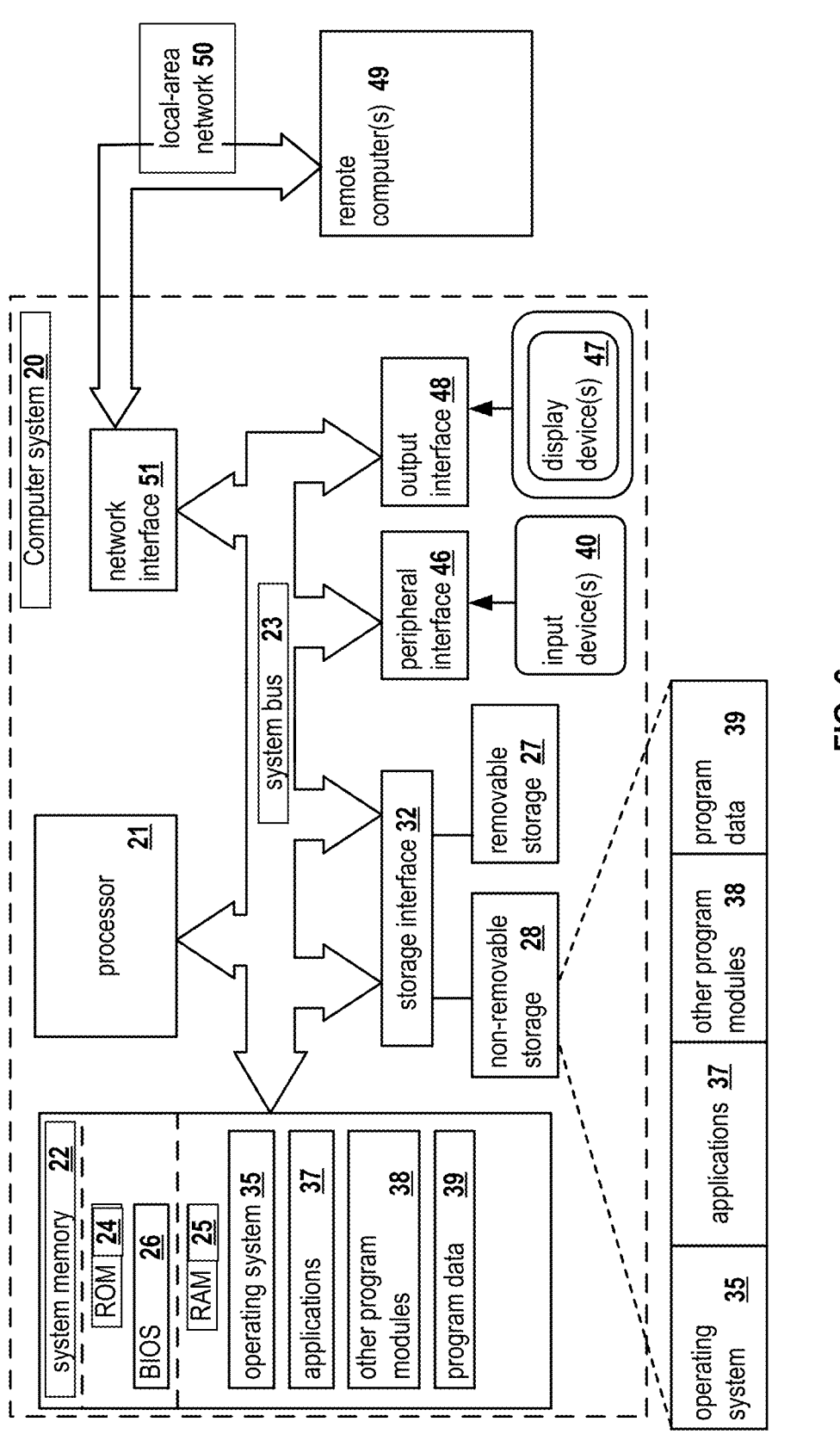
FIG. 6 presents an example of a general-purpose computer system on which aspects of the present disclosure can be implemented.

FIG. 6 is a block diagram illustrating a computer system 20 on which aspects of systems and methods for providing LLM embeddings using clusters and dictionaries may be implemented. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-5 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/ output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement a module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for providing large language model (LLM) embeddings, the method comprising:

receiving an input query to a LLM service from a user;

determining if a first embedding of the input query is provided by a main embedding model;

based on a determination that the first embedding is provided by the main embedding model, storing the input query and the first embedding as corresponding entries in an embeddings dictionary, wherein the first embedding being stored as a main embedding;

identifying an embeddings cluster similar to the input query, and computing a main centroid embedding for the embeddings cluster based on the first embedding; and based on a determination that the first embedding is not provided by the main embedding model, generating a second embedding for the input query using a fallback embedding model, searching the embeddings dictionary using the second embedding for a matching main embedding previously generated by the main embedding model, based on a determination that matching main embedding is found in the embeddings dictionary, sending the matching main embedding to the LLM service, and based on a determination that the matching main embedding is not found in the embeddings dictionary, identifying an embeddings cluster similar to the input query, and sending the main centroid embedding of the identified embeddings cluster to the LLM service.

2. The method of claim 1, wherein determining that the matching main embedding is found in the embeddings dictionary comprises: determining that a similarity between the second embedding and at least one entry in the embeddings dictionary is within a dictionary similarity threshold, and wherein determining that the matching main embedding is not found in the embeddings dictionary comprises determining that the similarity between the second embedding and at least one entry in the embeddings dictionary is not within the dictionary similarity threshold.

3. The method of claim 1, wherein identifying an embeddings cluster similar to the input query further comprises:

providing a plurality of embeddings clusters, wherein each embeddings cluster comprises at least a secondary centroid embedding computed based on a plurality of second embeddings generated by the fallback embedding model, and a corresponding main centroid embedding computed based on a plurality of main embeddings generated by the main embedding model; and selecting, out of the plurality of embeddings clusters, an embeddings cluster similar to the second embedding within a cluster similarity thresholds.

4. The method of claim 3, wherein a dictionary similarity threshold or the cluster similarity threshold is determined based on a similarity metric between distances of two or more embedding vectors.

5. The method of claim 4, wherein the similarity metric comprises one of: Jaccard similarity index and cosine similarity.

6. The method of claim 3, wherein the fallback embedding model is different from the main embedding model.

7. The method of claim 3, wherein the first embeddings and second embeddings have different vector dimensions.

8. The method of claim 1, wherein the main centroid embedding comprises an average or average dot product of two or more embedding vectors.

9. The method of claim 3, further comprising, broaden a scope of search by adjusting the cluster similarity threshold if no embeddings cluster similar to the second embedding was found within the plurality of embeddings clusters.

10. A system for providing large language model (LLM) embeddings, comprising:

at least one memory;

at least one hardware processor coupled with the at least one memory and configured, individually or in combination, to:

receive an input query to a LLM service from a user;

determine if a first embedding of the input query is provided by a main embedding model;

based on a determination that the first embedding is provided by the main embedding model, store the input query and the first embedding as corresponding entries in an embeddings dictionary, wherein the first embedding being stored as a main embedding;

identify an embeddings cluster similar to the input query, and compute a main centroid embedding for the embeddings cluster based on the first embedding; and based on a determination that the first embedding is not provided by the main embedding model, generate a second embedding for the input query using a fallback embedding model, search the embeddings dictionary using the second embedding for a matching main embedding previously generated by the main embedding model, based on a determination that matching main embedding is found in the embeddings dictionary, send the matching main embedding to the LLM service, and based on a determination that the matching main embedding is not found in the embeddings dictionary, identify an embeddings cluster similar to the input query, and sending the main centroid embedding of the identified embeddings cluster to the LLM service.

11. The system of claim 10, wherein determining that the matching main embedding is found in the embeddings dictionary comprises: determining that a similarity between the second embedding and at least one entry in the embeddings dictionary is within a dictionary similarity threshold, and wherein determining that the matching main embedding is not found in the embeddings dictionary comprises determining that the similarity between the second embedding and at least one entry in the embeddings dictionary is not within the dictionary similarity threshold.

12. The system of claim 10, wherein identifying an embeddings cluster similar to the input query further comprises:

providing a plurality of embeddings clusters, wherein each embeddings cluster comprises at least a secondary centroid embedding computed based on a plurality of second embeddings generated by the fallback embedding model, and a corresponding main centroid embedding computed based on a plurality of first embeddings generated by the main embedding model; and selecting, out of the plurality of embeddings clusters, an embeddings cluster similar to the second embedding within a cluster similarity thresholds.

13. The system of claim 12, wherein a dictionary similarity threshold or the cluster similarity threshold is determined based on a similarity metric between distances of two or more embedding vectors.

14. The system of claim 13, wherein the similarity metric comprises one of: Jaccard similarity index and cosine similarity.

15. The system of claim 12, wherein the fallback embedding model is different from the main embedding model.

16. The system of claim 12, wherein the first embeddings and second embeddings have different vector dimensions.

17. The system of claim 10, wherein the main centroid embedding comprises an average or average dot product of two or more embedding vectors.

18. The system of claim 12, wherein at least one hardware processor coupled with the at least one memory and is further configured, individually or in combination, to:

broaden a scope of search by adjusting the cluster simi-
larity threshold if no embeddings cluster similar to the
second embedding was found within the plurality of
embeddings clusters.

19. A non-transitory computer readable medium storing
thereon computer executable instructions for providing large
language model (LLM) embeddings, including instructions
for:

receiving an input query to a LLM service from a user;

determining if a first embedding of the input query is
provided by a main embedding model;

based on a determination that the first embedding is
provided by the main embedding model, storing the input query and the first embedding as corre-
sponding entries in an embeddings dictionary, wherein
the first embedding being stored as a main embedding;

identifying an embeddings cluster similar to the input
query, and computing a main centroid embedding for the embed-
dings cluster based on the first embedding; and based on a determination that the first embedding is not
provided by the main embedding model, generating a second embedding for the input query using
a fallback embedding model, searching the embeddings dictionary using the second
embedding for a matching main embedding previously
generated by the main embedding model, based on a determination that matching main embedding
is found in the embeddings dictionary, sending the
matching main embedding to the LLM service, and based on a determination that the matching main embed-
ding is not found in the embeddings dictionary, iden-
tifying an embeddings cluster similar to the input query,
and sending the main centroid embedding of the iden-
tified embeddings cluster to the LLM service.

20. The non-transitory computer readable medium of
claim 19, wherein determining that the matching main embedding is
found in the embeddings dictionary comprises: deter-
mining that a similarity between the second embedding
and at least one entry in the embeddings dictionary is
within a dictionary similarity threshold, and wherein determining that the matching main embedding is
not found in the embeddings dictionary comprises
determining that the similarity between the second
embedding and at least one entry in the embeddings
dictionary is not within the dictionary similarity thresh-
old.

* * * * *